United States Patent
Zhang et al.

(10) Patent No.: US 10,755,118 B2
(45) Date of Patent: Aug. 25, 2020

(54) METHOD AND SYSTEM FOR UNSUPERVISED LEARNING OF ROAD SIGNS USING VEHICLE SENSOR DATA AND MAP DATA

(71) Applicant: HERE GLOBAL B.V., Eindhoven (NL)

(72) Inventors: Zhenhua Zhang, Chicago, IL (US); Leon Stenneth, Chicago, IL (US); Ram Marappan, Naperville, IL (US)

(73) Assignee: HERE Global B.V., Eindhoven (NL)

(*) Notice: Subject to any disclaimer, the term of this patent is extended or adjusted under 35 U.S.C. 154(b) by 88 days.

(21) Appl. No.: 16/051,071

(22) Filed: Jul. 31, 2018

(65) Prior Publication Data

US 2020/0042806 A1 Feb. 6, 2020

(51) Int. Cl.
| | | |
|---|---|---|
| G06K 9/00 | (2006.01) | |
| G05D 1/02 | (2020.01) | |
| G01C 21/28 | (2006.01) | |
| G06K 9/62 | (2006.01) | |

(52) U.S. Cl.
CPC ......... *G06K 9/00818* (2013.01); *G01C 21/28* (2013.01); *G05D 1/0221* (2013.01); *G06K 9/6222* (2013.01)

(58) Field of Classification Search
CPC ......... H04L 29/08; H04L 67/12; H04L 29/06; G06K 9/00818; G06K 9/6222; G06K 9/00; G01C 21/28; G01C 21/32; G05D 1/0221; G05D 1/0088; G05D 1/088; B60W 2750/40; B60W 2550/404; B60W 30/14; G08G 1/01; G08G 1/0112; G08G 1/112; B60Q 9/00; G01S 19/07; G07C 5/00

USPC ...... 382/104, 103; 340/425.5, 905; 701/409, 701/420
See application file for complete search history.

(56) References Cited

U.S. PATENT DOCUMENTS

| | | | | |
|---|---|---|---|---|
| 8,634,980 | B1 * | 1/2014 | Urmson | G05D 1/0214 701/23 |
| 9,459,626 | B2 * | 10/2016 | Chen | G05D 1/0088 |
| 9,460,355 | B2 | 10/2016 | Stenneth et al. | |
| 9,530,313 | B2 * | 12/2016 | Dannenbring | G08G 1/096783 |
| 9,569,693 | B2 * | 2/2017 | Anastassov | G06K 9/6215 |
| 2016/0028824 | A1 * | 1/2016 | Stenneth | B60Q 9/008 709/219 |
| 2016/0104049 | A1 * | 4/2016 | Stenneth | G06K 9/00818 382/155 |
| 2016/0170414 | A1 * | 6/2016 | Chen | G08G 1/0112 701/27 |

(Continued)

FOREIGN PATENT DOCUMENTS

DE 102016216154 A1 3/2018

*Primary Examiner* — Mahendra R Patel
(74) *Attorney, Agent, or Firm* — Ditthavong & Steiner, P.C.

(57) ABSTRACT

A method, system, and computer program product is provided, for example, for identifying a type of road sign. The method may include receiving a plurality of observations for the road sign. The method may also include clustering the plurality of observations based on at least a location and a heading of the road sign. Further, the method may include filtering the plurality of observations in the cluster based on a speed value and a lateral offset of each of the plurality of observations. Also, the method may include identifying the type of the road sign based on the filtering.

20 Claims, 5 Drawing Sheets

(56) References Cited

U.S. PATENT DOCUMENTS

| | | | | |
|---|---|---|---|---|
| 2017/0277716 A1* | 9/2017 | Giurgiu | | G01C 21/32 |
| 2018/0024562 A1* | 1/2018 | Bellaiche | | B60W 30/12 |
| | | | | 701/26 |
| 2018/0025235 A1* | 1/2018 | Fridman | | G08G 1/096708 |
| | | | | 382/103 |
| 2018/0025628 A1* | 1/2018 | Ivanov | | G08G 1/052 |
| | | | | 701/117 |
| 2019/0325736 A1* | 10/2019 | Zhang | | G08G 1/0112 |

* cited by examiner

METHOD AND SYSTEM FOR UNSUPERVISED LEARNING OF ROAD SIGNS USING VEHICLE SENSOR DATA AND MAP DATA

TECHNOLOGICAL FIELD

The present disclosure generally relates to a system and method for providing assistance to a driver of a vehicle or the vehicle itself, and more particularly relates to a system and method for identifying a type of road sign based on sensor data and map data.

BACKGROUND

Currently the automotive industry is gravitating towards advanced driving automation solutions. The purpose of driving automation is to provide safe, comfortable and efficient mobility solutions for users and drivers alike. The real efficiency of an automated driving solution lies in how much of driving burden can it reduce, while providing efficient, accurate and risk-free driving decisions. Many automated driving solutions are based on usage of map databases for providing environmental, regulatory, and navigation related information in near real-time for performing driving actions in fully or semi-automated vehicles. Such map databases are updated with data related to road signs, speed limits, traffic conditions and the like, either using real-time crowd sourced data or by receiving regular updates to data.

Alongside the map data, vehicles also rely on complementary information received from vehicles' on-board sensors and driver cognition to enhance the accuracy of driving assistance decisions implemented in the vehicle. The map data tries to target 100% accuracy in real-time along with ingestion of vehicle smart sensor data and analysis, to provide efficient driving assistance. One such piece of map data may be related to speed values displayed on road signs.

BRIEF SUMMARY

In light of the above-discussed problems, there is a need to derive accurate data related to road signs, using information sources other than only the vehicle sensors, such as GPS sensors. The road signs may be static speed signs or variable speed signs (VSS), which need to be distinguished clearly based on raw OEM sensor data and map data.

The methods and systems disclosed herein provide for accurate road sign information determination using a vehicle OEM's sensor data. The road sign may include such as a traffic sign, a gantry, a speed limit sign and the like. Current solutions for road sign determination produces high amount of false positive gantries, such as gantries containing variable speed signs (VSSs). The purpose of the methods and systems disclosed herein is to reduce the occurrences of such false positives and provide accurate road sign data, such as location, speed value and the like, determination.

The method and systems disclosed herein provide for a layered unsupervised learning strategy with filters on number of different road signs in a cluster and number of different lateral offsets in a cluster.

In an example embodiment, a method for identification of a type of a road sign is provided. The method comprises receiving a plurality of observations for the road sign. The method further comprises clustering the plurality of observations for the road sign based on at least a location and a heading of the road sign. Additionally, the method includes filtering the plurality of observations in the cluster based on a speed value and a lateral offset of each of the plurality of observations. Further, the method comprises identifying the type of the road sign based on the filtering of the plurality of observations.

In some example embodiments, an apparatus for identifying a type of a road sign is provided. The apparatus may include at least one processor and at least one memory including computer program code for one or more programs. The at least one memory and the computer program code configured to, with the at least one processor, cause the apparatus to at least receive a plurality of observations for the road sign. The apparatus may further be caused to cluster the plurality of observations based on at least a location and a heading of the road sign. The apparatus is further caused to filter the plurality of observations in the cluster based on a speed value and a lateral offset of each of the plurality of observations. Also, the apparatus is further caused to identify the type of the road sign based on the filter.

In some example embodiments a computer program product is provided. The computer program product comprising at least one non-transitory computer-readable storage medium having computer-executable program code instructions stored therein, the computer-executable program code instructions comprising program code instructions for receiving a plurality of observations for the road sign. The computer-executable program code instructions further comprising program code instructions for clustering the plurality of observations based on at least a location and a heading of the road sign. The computer-executable program code instructions further comprising program code instructions for filtering the plurality of observations in the cluster based on a speed value and a lateral offset of each of the plurality of observations. Additionally, the computer-executable program code instructions comprising program code instructions for identifying the type of the road sign based on the filtering.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
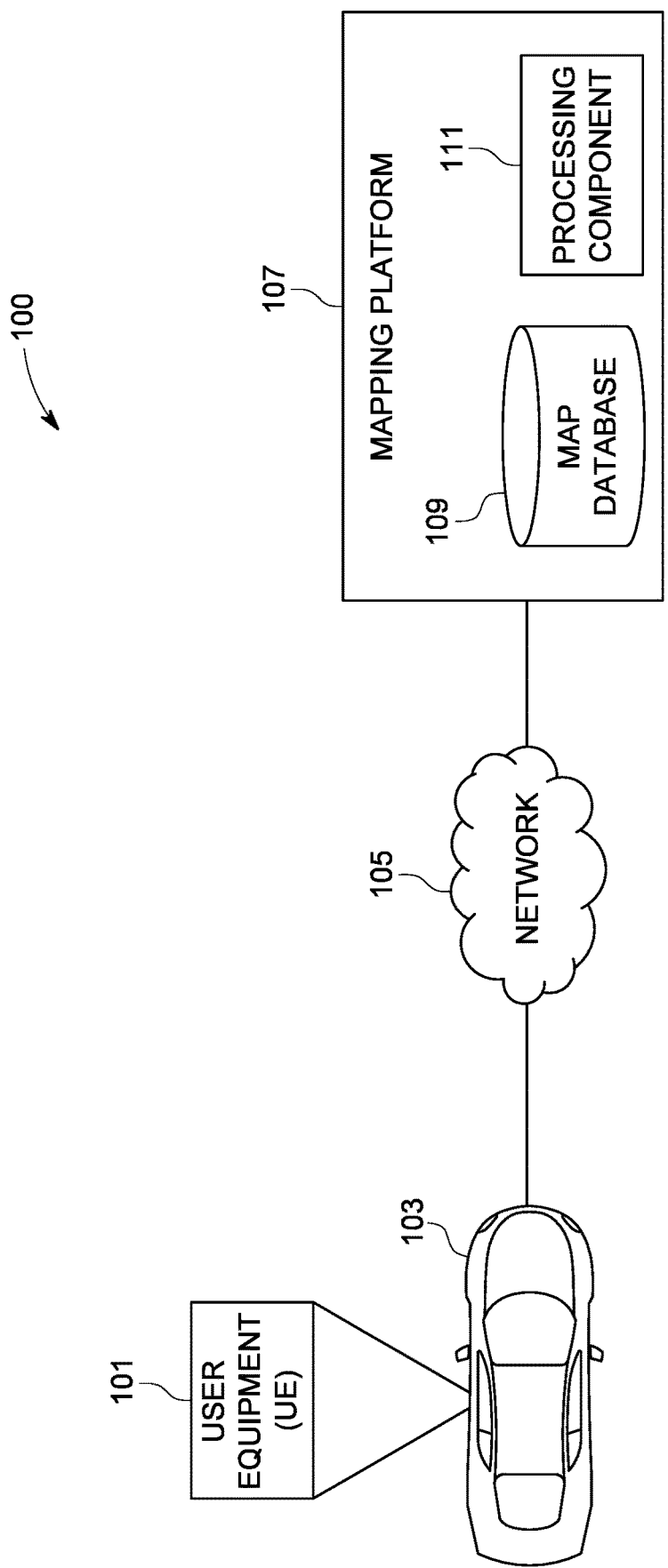
Figure 2:
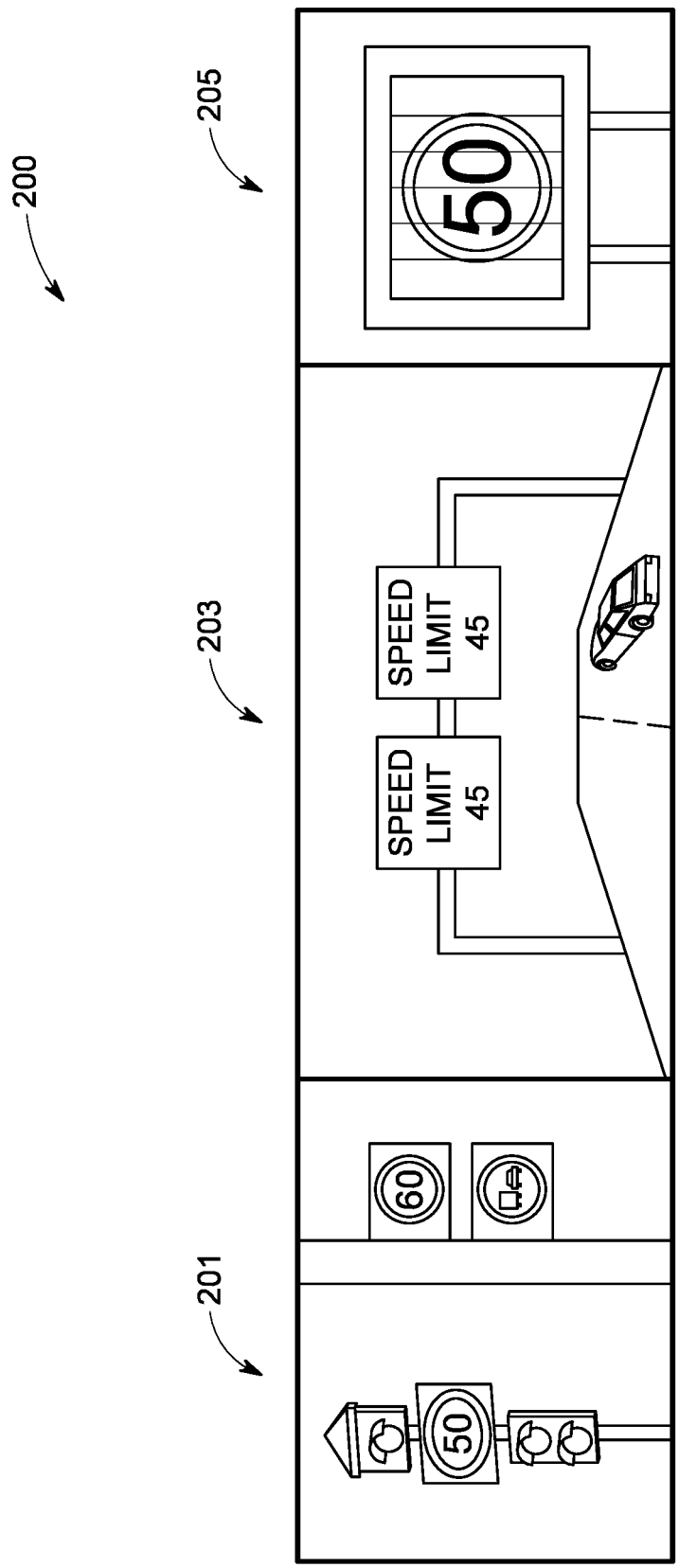
Figure 3:
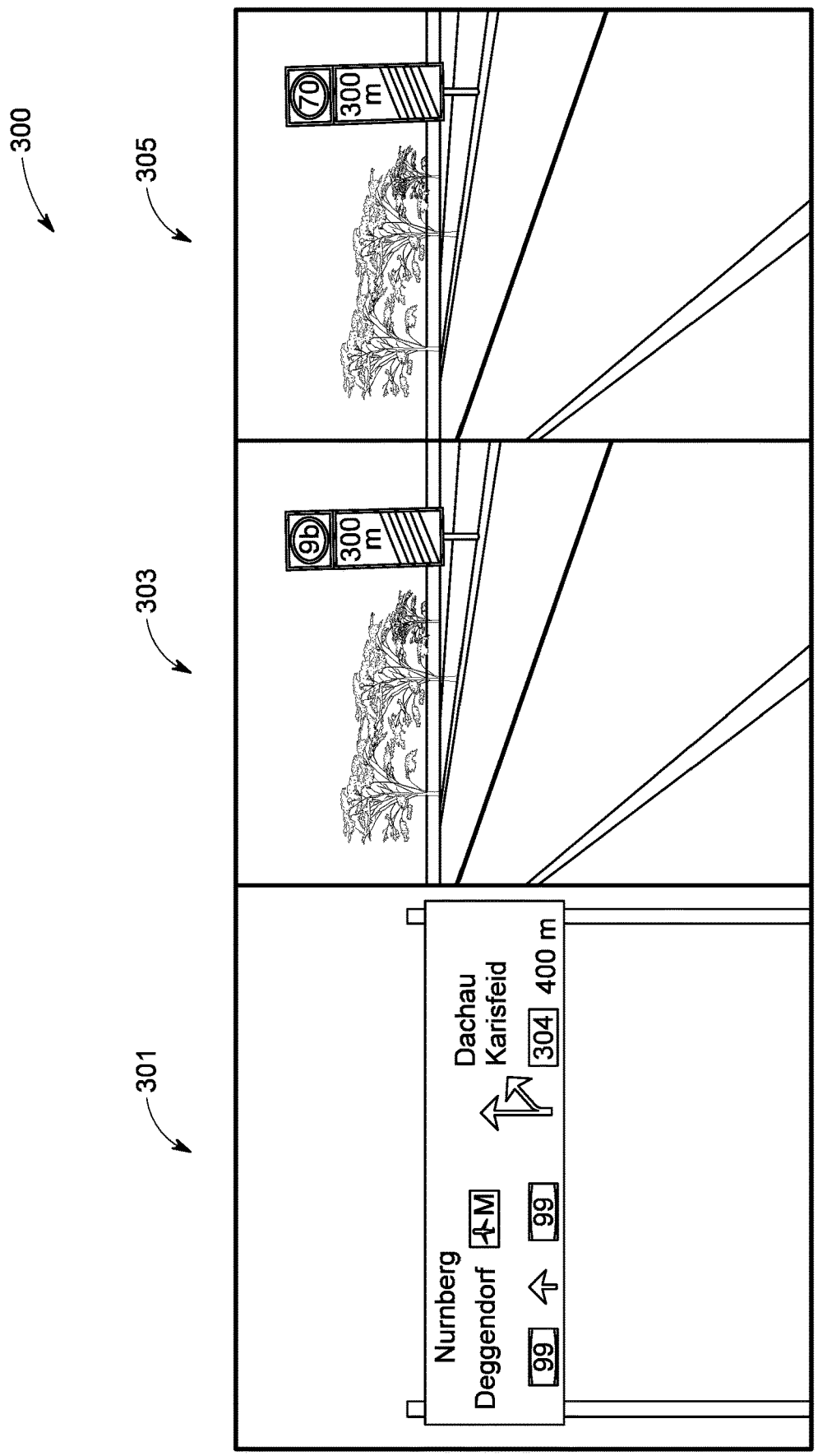
Figure 4:
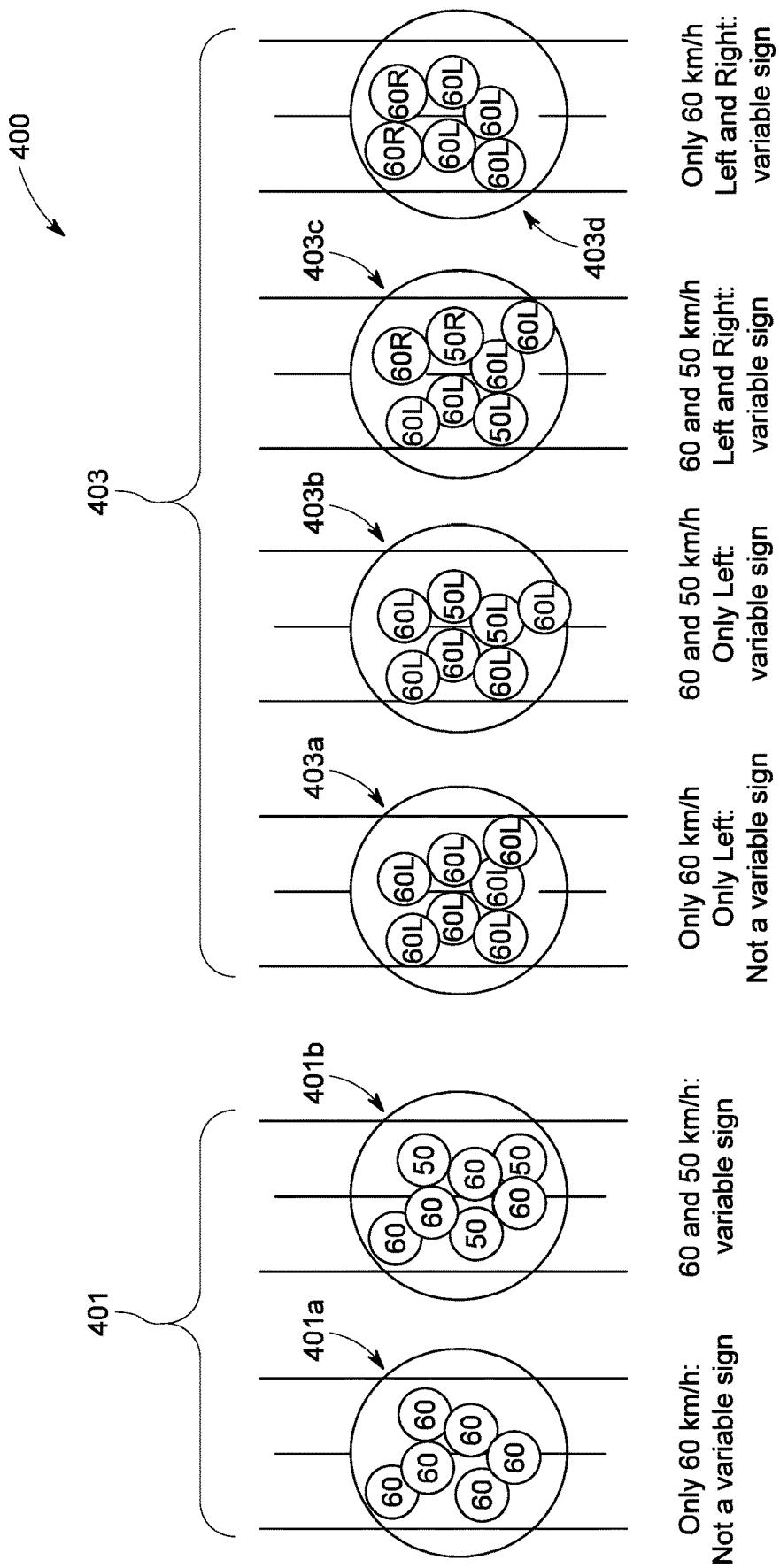
Figure 5:
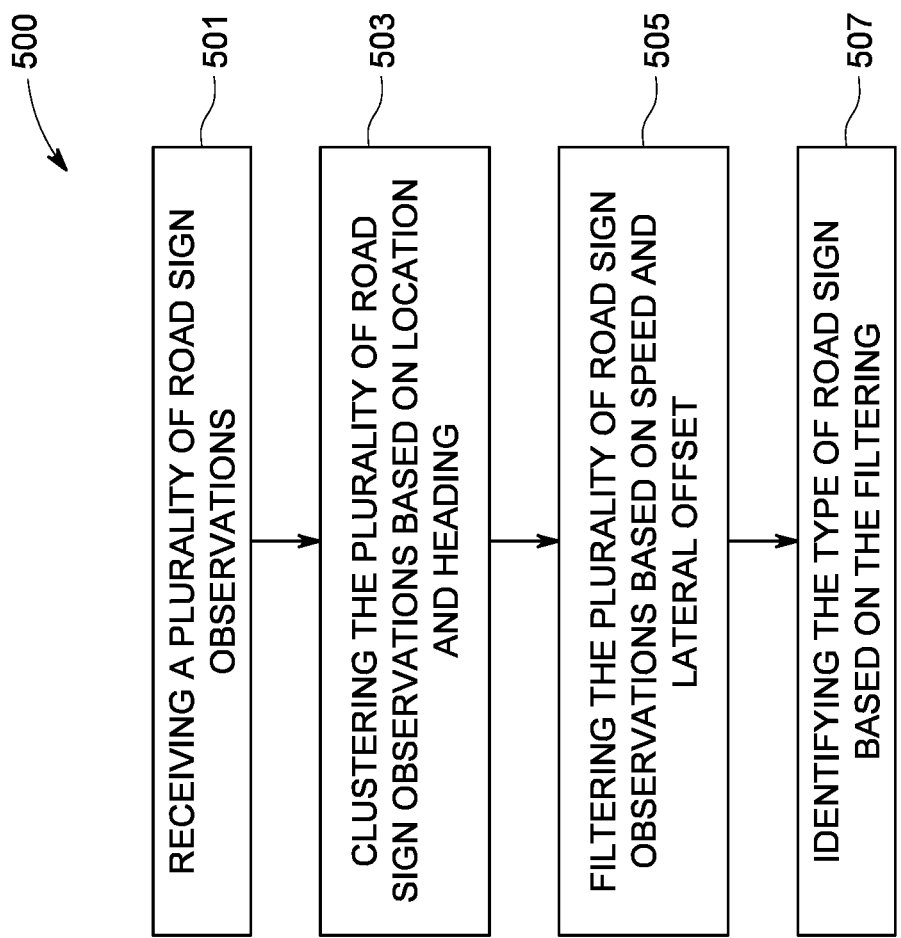

Having thus described example embodiments of the invention in general terms, reference will now be made to the accompanying drawings, which are not necessarily drawn to scale, and wherein:

FIG. 1 illustrates a block diagram of a system for identifying a road sign in accordance with an example embodiment;

FIG. 2 illustrates a diagram showing a plurality of types of road signs in accordance with an example embodiment;

FIG. 3 illustrates an exemplary diagram illustrating wrongly classified road signs according to an example embodiment;

FIG. 4 illustrates an exemplary diagram illustrating a method for clustering of road signs according to an example embodiment;

FIG. 5 illustrates a flow diagram of a method for identifying a road sign according to an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Definitions

The term "link" may be used to refer to any connecting pathway including but not limited to a roadway, a highway, a freeway, an expressway, a lane, a street path, a road, an alley, a controlled access roadway, a free access roadway and the like.

The term "shape point" may be used to refer to shape segments representing curvature information of various links, such as roadway segments, highway segments, roads, expressways and the like. Each shape point may be associated with coordinate information, such as latitude and longitude information. The intersections of shape points may be represented as nodes.

The term "node" may be used to refer to a point, such as a point of intersection between two line segments, which in some cases may be link segments.

The term "upstream link" may be used to refer to a link in a running direction or direction of travel of a vehicle.

The term "downstream link" may be used to refer to a link opposite to a running direction or direction of travel of a vehicle.

The term "heading" may be used to provide a measure of a direction for a point or a line and may be calculated relative to a north direction or a line-of-sight direction, as may be applicable.

The term "road sign" may be used to refer to any traffic or non-traffic related road sign, such as a static speed limit sign, a variable speed sign (VSS), a destination sign board, a direction indicator sign board, a banner, a flyer, a gantry, a hoarding, an advertisement and the like.

A method, apparatus, and computer program product are provided herein in accordance with an example embodiment for providing for identification of a type of road sign. In some example embodiments, the road sign may be a static speed sign or a variable speed sign. The static speed sign is used to display speed values that are static in nature, which is the speed values that are constant over a link irrespective of any external or environmental conditions. The variable speed sign on the other hand may be used to display speed values that are variable. In some example embodiments, the road sign, such as the speed limit sign, may be associated with a "permanency flag" that may be set to "static" or "variable" for the static speed sign and the variable speed sign respectively. The "permanency flag" may be stored in a database along with data related to speed signs. The variable speed sign may be displayed on a gantry, such as gantries visible on highways, roadways and other such links. Gantries may display variable speed signs which display multiple speed values based on various environmental conditions such as on time of day, traffic conditions, and the like. The locations of these variable speed signs should be learned and updated timely in a database to provide a good speed reference for autonomous or semi-autonomous vehicles. For another example, for gantry learning, data for multiple days (weekday and weekend) may be learned to increase the chances of detecting varying sign values reported at the same location which would indicate a variable speed sign. The methods and systems disclosed herein provide for such learning and identification of road signs, such as variable speed signs, based on clustering of multiple observations taken for the road sign at the same location.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

FIG. 1 illustrates a block diagram of a system 100 for identifying a road sign in accordance with an example embodiment. The system 100 may include a user equipment 101 installed in a vehicle 103 for detecting the road sign observation information. The vehicle 103 may include one or more sensors for taking the road sign observation. The road sign observation may be related to one or more road signs, such as a traffic sign, a gantry, a poster, a banner, an advertisement flyer, an LCD display, a direction signboard, a destination signboard, a speed limit sign, a variable speed limit sign (VSS) and the like. Thus, the road sign may either be traffic information related sign or a non-traffic information related sign. In some instances, the vehicle 103 may take the road sign observation in such a manner that a non-traffic information related sign, such as a picture, may be misclassified as traffic information related sign, leading to errors. In some example embodiments, these errors may be due to one or more sensors installed in the vehicle, such as the GPS sensor errors or the camera sensor errors.

In some example embodiments, GPS errors may lead to inaccurate identification of road sign locations and incorrectly map-matching road signs to wrong links. For example, map-matching road signs onto curved links are usually inaccurate if the road sign observation is simply based on GPS sensor information, such as GPS co-ordinates. In other examples, a static speed sign may be misclassified as a variable speed sign. In yet other examples, gantries containing variable speed signs may be incorrectly reported due to errors in the raw OEM sensor data.

The system 100 may be configured to reduce such OEM sensor related errors to counter this problem.

In some example embodiments, the vehicle 103 may detect a road sign using a sensor, such as a camera installed on the vehicle. The sensor may then send data related to the road sign, also referred to as the road sign observation for further processing, to a cloud based system, such as to a mapping platform 107. The data may then be processed, such as using a processing component 111 of the mapping platform 107 to learn about the road sign, such as a gantry, in a much more precise manner and provide less false positive results to improve the overall tradeoff of quality and coverage. The mapping platform 107 may be used to implement a layered unsupervised learning strategy with filters on number of different parameters of the road sign, such as the number of road signs in a cluster of road sign observations, the number of different lateral offsets in a cluster and the like.

The vehicle's 103 user equipment 101 may be connected to the mapping platform 107 over a network 105. The mapping platform 107 may include a map database 109 and the processing component 111.

The network 105 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of the vehicle 103.

In some example embodiments, the user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 107 via a processing component 111 through, for example, a mapping application, such that the user equipment 101 may provide navigational assistance to a user.

The mapping platform 107 may include a map database 109, which may include node data, road segment data, link data, point of interest (POI) data, link identification information, heading value records or the like. The map database 109 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 109 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 109 can include data about the POIs and their respective locations in the POI records. The map database 109 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 109 can include event data (e.g., traffic incidents, construction activities, scheduled events, unscheduled events, accidents, diversions etc.) associated with the POI data records or other records of the map database 109 associated with the mapping platform 107.

A content provider e.g., a map developer may maintain the mapping platform 107. By way of example, the map developer can collect geographic data to generate and enhance mapping platform 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 109 of the mapping platform 107 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, driving maneuver related functions and other functions, by a navigation device, such as by user equipment 101, for example. The navigation device may be used to perform navigation-related functions that can correspond to vehicle navigation, pedestrian navigation, and vehicle lane changing maneuvers, vehicle navigation towards one or more geo-fences, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the map database 109 may be a master geographic database configured at a server side, but in alternate embodiments, a client side-map database 109 may represent a compiled navigation database that may be used in or with end user devices (e.g., user equipment 101) to provide navigation and/or map-related functions. For example, the map database 109 may be used with the end user device 101 to provide an end user with navigation features. In such a case, the map database 109 can be downloaded or stored on the end user device (user equipment 101) which can access the map database 109 through a wireless or wired connection, over the network 105. This may be of particular benefit when used for navigating within spaces that may not have provisions for network connectivity or may have poor network connectivity, such as an indoor parking facility, a remote street near a residential area and the like. As many parking facilities are multi-level concrete and steel structures, network connectivity and global positioning satellite availability may be low or non-existent. In such cases, locally stored data of the map database 109 regarding the parking spaces may be beneficial as identification of suitable parking spot in the parking space could be performed without requiring connection to a network or a positioning system. In such an embodiment, various other positioning methods could be used to provide vehicle reference position within the parking facility, such as inertial measuring units, vehicle wheel sensors, compass, radio positioning means, etc.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, for example, and for determination of one or more personalized routes or route segments, direction of travel of vehicle, heading of vehicles and the like. The direction of travel of the vehicle may be derived based on the heading value associated with a gantry on a link, such as a roadway segment.

In one example embodiment, the user equipment 101 may use the sensor data gathered by one or more sensors installed in the vehicle 103 to collect observations for road signs. Such data for road sign observations may be may be collected over a period of several days. For example, the sensor data may be collected on five days, including weekdays and weekday. This may be done to collect observations for road sign since speed limit values vary on variable speed sign gantry depending on traffic condition, day of week, etc. In some examples, some combination of batched and real time sensor data may also be used since batch data have higher coverage while real time data is of higher quality. The sensor data may then be used to perform clustering on road sign data observations collected over various days for different types of road signs, such as a variable speed sign.

FIG. 2 illustrates a diagram showing a plurality of types of road signs 200 in accordance with an example embodiment. The plurality of types of road signs 200 may include a sign 201 placed near a traffic light, a gantry 203, or a sign board 205. The common characteristic amongst all these signs is that these are variable speed signs. The speed value displayed on these signs may change depending on time of day, traffic conditions, etc. Thus, in a navigation based system, such as the UE 101 installed in the vehicle 103, it is important to identify the correct speed values and provide accurate speed information for navigation related functions. Thus, the locations of these variable signs should be learned and updated timely to provide a good speed reference for autonomous vehicles. This needs road sign recognition systems which can correctly identify road signs and speed values displayed on them. The data for road signs may be maintained in a database of mapping application, such as the map database 109 of the mapping platform 107. The data stored in the map database 109 needs to be accurate and up-to-date for use in navigation applications. However, this may not always be the case in current road sign recognition systems.

This may be due to the problem that current road sign recognition systems are able to distinguish the speed values on road signs but cannot distinguish variable signs to static signs. In some example embodiments, the map database 109 may be configured to store a "permanency flag" for each road sign, to indicate whether the road sign is a static speed sign or a variable speed sign. For example, a permanency flag=static may indicate a static speed sign, while a permanency flag="variable" may indicate a variable speed sign. However, errors in road sign may still arise. This may be due to the reason that some road sign recognition systems have the functions to distinguish variable signs but can make mistakes in blue signs or route number indicators.

FIG. 3 illustrates an exemplary diagram illustrating wrongly classified road signs 300 according to an example embodiment.

The road signs 300 may include such as a destination sign 301, or signs 303-305 indicating distance values on sign boards, such as blue sign boards which may be wrongly detected as speed signs by vehicle's OEM sensors.

The methods and systems disclosed herein make use of a layered unsupervised learning strategy to filter out such wrongly classified road signs as speed signs. The learning strategy disclosed in the example embodiments discussed herein provide for less false positive results in identification of road signs. The learning strategy is based on clustering of road sign observations taken from OEM sensors based on properties of road signs. On such property of a road sign may be a "lateral offset". The lateral offset is the side of the road sign. The value of lateral offset can be either left, or right, or even middle for each road sign observation. This value may be obtained from raw data related to sensor that may be provided from OEM. The use of lateral offset may be done because normal static signs are usually placed on one side of the road while variable signs are usually gantries, as shown in FIG. 2. Thus, gantries may have more than 2 lateral offsets even if the speed value is the same. Further, the data used for detecting gantries are live sensor data. These data are mainly used for detecting the digital screens of variable signs. Thus, even though there may be some errors, the normal static signs are not likely to be detected. The criteria to identify the variable sign which have "same value but two lateral offset" will not easily include the normal static signs placed on both sides of the road shown, such as the signs 303 and 305 shown in FIG. 3. Also, the lateral offset may help to filter out the blue signs such as route number shown in signs 303 and 305.

Using lateral offset as a filter parameter, the wrongly classified road sign observations may be removed from clusters of road sign observations detected by the OEM sensors.

FIG. 4 illustrates an exemplary diagram illustrating a method 400 for clustering of road signs according to an example embodiment.

As shown in FIG. 4, using filtering 401, the road sign observations for a road sign may be clustered based on speed values to judge how many categories of speed values are there in a cluster. For example, cluster 401a illustrates that road sign observations have only a single speed value, 60 km/h. Thus, these observations cannot be for a variable sign. However, cluster 401b has two different speed values, 60 and 50 km/h, thus, these observations are for a variable sign.

In FIG. 4, using filtering 403, however, illustrates both speed as well as lateral offset based filtering. For example, cluster 403a shows a cluster of road sign observations including only a single speed value and a single value of lateral offset, that is left. Thus, observations in the cluster 403a depict a speed value of 60 for left side and there are no variations. Thus, these observations could not be for a variable sign.

Cluster 403b illustrates two speed values, 60 and 50 km/h, and only one lateral offset value, left. Thus, these observations are for a variable sign.

Cluster 403c illustrates road sign observations with two different speed values, 60 and 50 km/h, and two different lateral offsets left and right. Thus, these observations definitely correspond to a variable sign.

Cluster 403d illustrates road sign observations with single speed value, 60 km/h, but two different lateral offsets left and right. These observations correspond to a variable speed sign. Thus, the clustering and filtering of road sign observations in this way may provide accurate classification of road signs using raw OEM sensor data.

The methods and systems disclosed herein provide for clustering of road sign observations based on various properties of the road signs, such as location where the road sign is placed and heading of the road sign. The first step in learning about the road signs is clustering of road sign observations. The road sign observations for the same traffic signs may be densely-distributed over a small geographic scale. Thus, for clustering these observations, a density based clustering algorithm may be used, for example, layered Density-based spatial clustering of applications with noise (DBSCAN) algorithm may be used in an exemplary embodiment for clustering the road sign observations and generating the cluster centers.

In an example embodiment, the layered DBSCAN method may start with clustering the locations of the road sign observations and then clustering the headings of the road sign observations.

In an example, in location clustering, the minimum number of signs to form a cluster may be set to be within a range of 3 to 10 observations and the largest searching radius may be set to be within a range of 10 meters to 25 meters. For example, in a specific case of clustering, the minimum number of observations for the road sign to form a cluster may be set to 3, and the largest searching radius may be 15 meters. This clustering only uses the latitude and longitude of the road sign observations. However, using only latitude and longitude information, the road sign observations in opposite direction of the same link may be put into the same cluster. To overcome this challenge, road sign observations in opposite direction of the same link, heading clustering may be performed on these road sign observations. In heading clustering, clustering of the headings of the road sign observations which are put into the same location cluster is performed.

In some example embodiments, in heading clustering, the minimum number of road signs to form a cluster may be set to be within a range of 3 to 10 and the largest searching radius may be set to be within a range of 10 degrees to 50 degrees. For example, in a specific implementation, the minimum number of observations of road signs for implementing the density based clustering may be set to 3 and the searching radius may be set to 15 degrees. That is to say, the observations within 15 degrees heading difference may be considered to be a part of the same cluster. The heading may be calculated as the degree difference between driving direction and due north, thus the heading of 359 degree and 1 degree should be in the same clustering. Thus, any two clustering centers whose degree difference is greater than 345 degrees (calculated as 360−15) may be combined for the purpose of heading clustering. The road sign observations put into the same clusters are expected to be those on the same link for the same sign. There may be a plurality of such road sign observations which are clustered using the layered DBSCAN algorithm based on location and heading of the road sign for which the observations are taken. After clustering, these plurality of observations in the cluster may be filtered to remove any wrongly considered road sign observations, such as to filter out the blue signs or route number indicators discussed in FIG. 3.

In an example embodiment, the filtering may be performed based on a speed value, such as speed limit value, and a lateral offset of each of the plurality of observations of road sign.

In speed filtering, those road sign observations may be filtered out in which there are only one category of speed value and type in a cluster. For example, the road sign observations depicted in 401a. This is because for the variable sign, the speed changes its speed value over time and days. Thus, for all the road sign observations in the same cluster, if there is more than one category of speed value and type combinations, it is highly possible it is a true variable sign.

Further, in speed and lateral offset filtering, those road sign observations may be filtered out in which there are only one category of speed value and type and one category of lateral offset in a cluster. For example, the observations shown in 403a may be filtered out. In such cases if we use only speed filtering, that may wrongly filter out the true variable signs which do not change values frequently. If the observation period is not long enough or there are some mechanical malfunctions in the variable signs, this may lead to a lot of real variable signs being filtered out. Thus, adding a lateral offset filtering on top of the speed value filtering proves advantageous in this case. For the road sign observations in the same cluster with only one kind of speed value and type combination, if there are more than one categories of lateral offsets, these are still taken as the real variable sign cluster observations. For example, the cluster 403d depicted in FIG. 4. This additional filtering makes the road sign filtering stricter and more accurate.

Once the filtering has been done on each cluster, the mean of latitude, longitude and heading in each cluster may be computed to determine as the real variable sign location and heading. Theoretically, there may be a distance gap between the calculated and real locations. In some example embodiments, these problems may be solved by using a map-matching method which can adjust the locations of the road signs to a downstream link start if they are too close to the link end.

In some example embodiments, the processing operations including clustering and filtering of road sign observations may be performed by the mapping platform 107, such as by using the processing component 111. An exemplary method for performing road sign identification based on the techniques discussed above is provided in FIG. 5.

FIG. 5 illustrates a flow diagram of a method 500 for identifying a road sign according to an example embodiment. The method 500 may be based on the clustering and filtering techniques discussed in conjunction with FIG. 4.

The method 500 may include, at 501, receiving a plurality of road sign observations. This plurality of road sign observations may be collected over a period of several days by the OEM sensors. The plurality of observations may then be clustered, at 503, based on the location and the heading information of the road sign.

In some example embodiments, the location and heading of the road sign may be derived from the map database 109 of the mapping platform 107.

In some example embodiments, the plurality of road sign observations may be filtered on the basis of a density based clustering algorithm, such as a layered DBSCAN algorithm. The layered density based clustering may include first clustering the plurality of observations based on their location, and then further clustering the plurality of observations in the location clusters based on their heading. Further, the method 500 may include, at 505, filtering the plurality of road sign observations based on speed and lateral offset values. As already discussed, the lateral offset may define a side of the road sign. Thus, performing lateral offset based filtering, in addition to the speed value filtering may provide more accurate and precise road sign identification. At 507, based on filtering of the road sign observations, the type of road sign may be identified. For example, the type of the road sign may be variable speed sign. Thus, while speed filtering may filter out signs in which there is only one combination of speed value and type in one cluster, both speed and lateral offset filtering may filter out signs in which there is only one speed value and one lateral offset in one cluster. The method 500 may thus be able to remove the wrongly detected signs, such as the blue signs or ramp indicator signs, and provide increased precision in road sign identification using raw sensor data.

In an example embodiment, an apparatus for performing the method 500 of FIG. 5 above may comprise a processor (e.g. the processor 111) configured to perform some or each of the operations of the method of FIG. 5 described previously. The processor may, for example, be configured to perform the operations (501-507) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-507) may comprise, for example, the processor 111 which may be implemented in the user equipment 101 and/or a device or circuit for executing instructions or executing an algorithm for processing information as described above.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for identifying a type of road sign comprising:
   receiving, via one or more sensors of a vehicle, a plurality of observations for the road sign;
   clustering the plurality of observations based, at least in part, on a location information, a heading information, or a combination thereof of the road sign;
   filtering the plurality of observations within the cluster based, at least in part, on a speed value and a lateral offset value of each of the plurality of observations, wherein the lateral offset value represents position of the road sign with respect to a road segment; and
   identifying the type of the road sign as a static sign or a variable sign based on the filtering.

2. The method of claim 1, wherein
   the road sign is identified as a variable sign based, at least in part, on a determination that the road sign has different speed values and one lateral offset value, or a same speed value and two or more different lateral offset values.

3. The method of claim 2, wherein the type of the road sign comprises a gantry, a speed limit sign, or a variable speed limit sign (VSS).

4. The method of claim 1, wherein the clustering is further based on a predetermined number of observations of the road sign and a searching radius threshold for the road sign.

5. The method of claim 4, wherein the clustering is further based on a latitude value, a longitude value, or a combination thereof for each of the plurality of observations.

6. The method of claim 1, wherein the clustering is further based, at least in part, on the heading information of the plurality of observations put into a same location cluster.

7. The method of claim 5, further comprising:
   calculating a mean of the latitude value, the longitude value, the heading information, or a combination thereof for the cluster to determine a real location and heading of the road sign.

8. An apparatus for identifying a type of road sign, the apparatus comprising:
   at least one processor; and
   at least one memory including computer program code for one or more programs,
   the at least one memory and the computer program code configured to, with the at least one processor, cause the apparatus to perform at least the following:
   receive, via one or more sensors of a vehicle, a plurality of observations for the road sign;
   cluster the plurality of observations based, at least in part, on a location information, a heading information, or a combination thereof of the road sign;
   filter the plurality of observations within the cluster based, at least in part, on a speed value and a lateral offset value of each of the plurality of observations, wherein the lateral offset value represents position of the road sign with respect to a road segment; and identify the type of the road sign as a static sign or a variable sign based on the filtering.

9. The apparatus of claim 8, wherein of the road sign is identified as a variable sign based, at least in part, on a determination that the road sign has different speed values and one lateral offset value, or a same speed value and two or more different lateral offset values.

10. The apparatus of claim 8, wherein the clustering is further based on a predetermined number of observations of the road sign and a searching radius threshold for the road sign.

11. The apparatus of claim 8, wherein the clustering is further based on a latitude value, a longitude value, or a combination thereof for each of the plurality of observations.

12. The apparatus of claim 8, wherein the clustering is further based, at least in part, on the heading information of the plurality of observations put into a same location cluster.

13. The apparatus of claim 11, wherein the apparatus is further caused to:
calculate a mean of the latitude value, the longitude value the heading information, or a combination thereof in each for the cluster to determine a real location and heading of the road sign.

14. A computer program product comprising at least one non-transitory computer-readable storage medium having computer-executable program code instructions stored therein, the computer-executable program code instructions comprising program code instructions for:
receiving, via one or more sensors of a vehicle, a plurality of observations for the road sign;
clustering the plurality of observations based, at least in part, on a location information, and a heading information, or a combination thereof of the road sign;
filtering the plurality of observations within the cluster based, at least in part, on a speed value and a lateral offset value of each of the plurality of observations, wherein the lateral offset value represents position of the road sign with respect to a road segment; and
identifying the type of the road sign as a static sign or a variable sign based on the filtering.

15. The computer program product of claim 14, wherein the road sign is identified as a variable sign based, at least in part, on a determination that the road sign has different speed values and one lateral offset value, or a same speed value and two or more different lateral offset values.

16. The method of claim 1, further comprising:
identifying the road sign as a static sign based, at least in part, on a determination that the road sign has a same speed value and one lateral offset value.

17. The method of claim 1, wherein the position of the road sign comprises a left side position, a right side position, a middle position, or a combination thereof with respect to the road segment.

18. The apparatus of claim 8, wherein the apparatus is further caused to:
identify the road sign as a static sign based, at least in part, on a determination that the road sign has a same speed value and one lateral offset value.

19. The apparatus of claim 8, wherein the position of the road sign comprises a left side position, a right side position, a middle position, or a combination thereof with respect to the road segment.

20. The computer program product of claim 14, wherein the apparatus is further caused to:
identifying the road sign as a static sign based, at least in part, on a determination that the road sign has a same speed value and one lateral offset value.

* * * * *